United States Patent
Massimo et al.

(10) Patent No.: US 6,607,582 B2
(45) Date of Patent: Aug. 19, 2003

(54) METHOD OF FEEDING, WITH IMPURE NITROGEN, THE COMBUSTION CHAMBER OF A GAS TURBINE COMBINED WITH AN AIR DISTILLATION UNIT, AND CORRESPONDING ELECTRICITY GENERATION PLANT

(75) Inventors: Giovanni Massimo, Brussels (BE); Jean Marc Peyron, Creteil (FR)

(73) Assignee: L'Air Liquide - Societe Anonyme a Directoire et Conseil de Surveillance pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 10/118,044

(22) Filed: Apr. 9, 2002

(65) Prior Publication Data

US 2002/0152891 A1 Oct. 24, 2002

(30) Foreign Application Priority Data

Apr. 10, 2001 (FR) .............................. 01 04870

(51) Int. Cl.$^7$ ............................ B01D 53/04; B01D 53/26
(52) U.S. Cl. .............................. 95/99; 62/648; 95/106; 95/120; 95/139; 96/130; 96/144
(58) Field of Search .......................... 62/641, 648, 652; 95/97–99, 104–106, 120, 139; 96/130, 143, 144

(56) References Cited

U.S. PATENT DOCUMENTS

| | | | | |
|---|---|---|---|---|
| 4,557,735 A | * | 12/1985 | Pike | ............................... 95/99 |
| 4,806,136 A | | 2/1989 | Kiersz et al. | .................. 62/18 |
| 5,425,240 A | * | 6/1995 | Jain et al. | ...................... 62/641 |
| 5,551,257 A | * | 9/1996 | Jain | ............................. 62/644 |
| 5,560,763 A | * | 10/1996 | Kumar | .......................... 95/98 |
| 5,661,987 A | * | 9/1997 | Zarate | ......................... 62/641 |
| 5,730,003 A | * | 3/1998 | Nguyen et al. | ............... 62/648 |
| 5,743,112 A | * | 4/1998 | Yamamoto et al. | ........... 62/643 |
| 5,778,698 A | * | 7/1998 | Yamamoto | .................... 62/652 |
| 5,802,872 A | * | 9/1998 | Billingham et al. | .......... 62/641 |
| 5,855,650 A | * | 1/1999 | Kalbassi et al. | .............. 95/106 |
| 6,050,106 A | * | 4/2000 | Yamamoto et al. | ........... 62/643 |
| 6,080,226 A | | 6/2000 | Dolan et al. | ................... 95/100 |
| 6,083,299 A | * | 7/2000 | Kapoor et al. | ................ 95/100 |
| 6,125,655 A | * | 10/2000 | Millet et al. | .................. 62/641 |
| 6,319,303 B1 | * | 11/2001 | Guillard et al. | ................ 95/97 |
| 6,402,809 B1 | * | 6/2002 | Monereau et al. | ............. 95/14 |
| 6,402,814 B1 | * | 6/2002 | Kraus et al. | ................... 95/106 |
| 6,494,060 B1 | * | 12/2002 | Bergman, Jr. | ................ 62/652 |
| 6,499,312 B1 | * | 12/2002 | Bergman et al. | ............. 62/643 |
| 2002/0139246 A1 | * | 10/2002 | Kumar et al. | .................. 95/98 |

FOREIGN PATENT DOCUMENTS

| EP | 1 043 557 | 10/2000 |
|---|---|---|
| EP | 1 120 617 | 8/2001 |

* cited by examiner

Primary Examiner—Robert H. Spitzer
(74) Attorney, Agent, or Firm—Young & Thompson

(57) ABSTRACT

The air distillation unit (2) has a low-pressure column (11C) which operates clearly above atmospheric pressure. The waste nitrogen coming from this column serves to purge, under low pressure, the air purification adsorbers (10A, 10B) in order to desorb them of the contaminants (water and $CO_2$), then is mixed with the impure nitrogen stream sent directly to the nitrogen compressor (14) which feeds the combustion chamber (8) of the gas turbine (1). At the start of regeneration, each adsorber is decompressed down to atmospheric pressure, then brought back up to the low pressure by impure nitrogen.

13 Claims, 5 Drawing Sheets

METHOD OF FEEDING, WITH IMPURE NITROGEN, THE COMBUSTION CHAMBER OF A GAS TURBINE COMBINED WITH AN AIR DISTILLATION UNIT, AND CORRESPONDING ELECTRICITY GENERATION PLANT

FIELD OF THE INVENTION

The present invention relates to a method of feeding, with impure nitrogen, the combustion chamber of a gas turbine combined with an air distillation unit, the air distillation unit being equipped with an apparatus for purifying air of water and of $CO_2$ by adsorption, this apparatus comprising two adsorbers, each one of which follows an operating cycle which comprises, alternately and cyclically, a co-current adsorption phase at a high pressure of the cycle, and a regeneration phase, the regeneration phase comprising a decompression step (a), a step (c) of counter-current purging by waste gas from the air distillation unit coming from a low-pressure column of this unit, and a step (d) of recompressing the adsorber up to the high pressure of the cycle.

The pressures involved here are absolute pressures.

BACKGROUND OF THE INVENTION

The gas turbines used to drive an alternator for generating electricity are fed by a gas coming from a combustion chamber. This chamber is mainly fed by air compressed by an air compressor, which is, for example, coupled to the turbine, and by a fuel gas. The temperature of the flame, and therefore the generation of $NO_2$, is adjusted by additional injection of nitrogen into the combustion chamber.

The fuel gas is often produced by a gasifier fed, on the one hand, by oxygen, and on the other hand, by carbon products, such as coal. An air distillation unit then produces the oxygen consumed by the gasifier and the nitrogen sent to the combustion chamber.

The waste gas from the low-pressure column of an air distillation unit, for example, a double air distillation column, is impure nitrogen typically containing 0.5 to 1% oxygen, and may therefore provide nitrogen for the combustion chamber, the maximum permissible oxygen content for this gas typically being 2%. In some plants, where all the products from the air distillation unit are utilized under pressure and where the nitrogen flow rate demanded by the gas turbine is high, it is advantageous to choose a low pressure clearly greater than atmospheric pressure (typically 3 to 4 bar, which corresponds to a medium distillation pressure greater than 1C bar), and to purge the purification adsorbers under this low pressure. This is because this makes it possible to recover the gas having carried out the purging and to mix it with impure nitrogen sent directly from the air distillation unit to the gas turbine, without carrying out expansion or recompression which are costly in terms of power.

As is well known, purging the adsorber has the effect of desorbing the contaminants (mainly water and $CO_2$) which have been removed from the air during the previous adsorption phase.

However, this option comes up against a problem at the end of the decompression step, the adsorber still contains much oxygen, such that the gas coming from the adsorber at the start of the purging phase has an oxygen content greater than the maximum permissible content for the feeding of the combustion chamber.

SUMMARY OF THE INVENTION

The aim of the invention is to solve this problem, that is to say to make it possible, simply and economically, to recompress the purging gas for feeding the combustion chamber of the gas turbine.

To this end, the subject of the invention is a method of the aforementioned type, characterized in that:
- the low-pressure column operates at a low pressure which is clearly greater than atmospheric pressure;
- the waste gas is used almost at the low pressure for the purging step (c);
- the decompression step (a) is continued down to a minimum pressure of the cycle which is clearly less than the low pressure;
- between the decompression step (a) and the purging step (c) a partial repressurization step (b) is inserted, in which the adsorber is repressurized by means of waste gas up to almost the purging pressure; and
- the waste gas coming from the adsorber during the purging step (c) is mixed with the waste gas produced by the air distillation unit, and the mixture is compressed by a nitrogen compressor in order to feed the combustion chamber of the gas turbine.

The method according to the invention may comprise one or more of the following characteristics:
- the minimum pressure of the cycle is almost atmospheric pressure;
- after the partial repressurization step (b), an additional step (b') of depleting the adsorber of oxygen is carried out at least once, which step comprises the following substeps:
  - (b'1) additional decompression of the adsorber down to the minimum pressure, and
  - (b'2) additional partial repressurization up to the purging pressure, then the purging step (c) is carried out;
- the purging step (c) comprises a substep (c2) during which the waste gas is heated followed by a substep (c3) during which the waste gas is not heated;
- a nitrogen-rich gas, having at least the nitrogen content of the impure nitrogen, not coming directly from the low-pressure column, is used in order to carry out the or each partial repressurization step;
- the nitrogen-rich gas comes from a nitrogen distribution network; and
- the nitrogen-rich gas comes from an auxiliary tank fed by part of the gas delivered by the nitrogen compressor.

The subject of the invention is also an electricity generation plant adapted to implement such a method.

This plant, of the type comprising a gas turbine, an air distillation unit producing impure nitrogen, the air distillation unit being equipped with an apparatus for purifying air of water and of $CO_2$ by adsorption, this apparatus comprising at least two, preferably only two, adsorbers, each one of which follows an operating cycle which comprises, alternatively and cyclically, a co-current adsorption phase at a high pressure of the cycle, and a regeneration phase, the regeneration phase comprising a decompression step (a), a step (c)of counter-current purging by waste gas from the air distillation unit coming from a low-pressure column of this unit, and a step (d) of recompressing the adsorber up to the high pressure of the cycle, and a nitrogen compressor, the intake of which is connected to the air distillation unit by means of a feed pipe and the delivery side of which is connected to the combustion chamber of the gas turbine, in which:

the air distillation unit produces impure nitrogen under a low pressure which is clearly greater than atmospheric pressure;

a first impure nitrogen pipe fitted with a valve connects the air distillation unit to the purified air outlet of each adsorber; and a second impure nitrogen pipe fitted with a valve connects the air inlet of each adsorber to the feed pipe.

BRIEF DESCRIPTION OF THE DRAWINGS

Exemplary implementations of the invention will now be described with regard to the appended drawings in which.

DETAILED DESCRIPTION OF THE INVENTION

Figure 1:
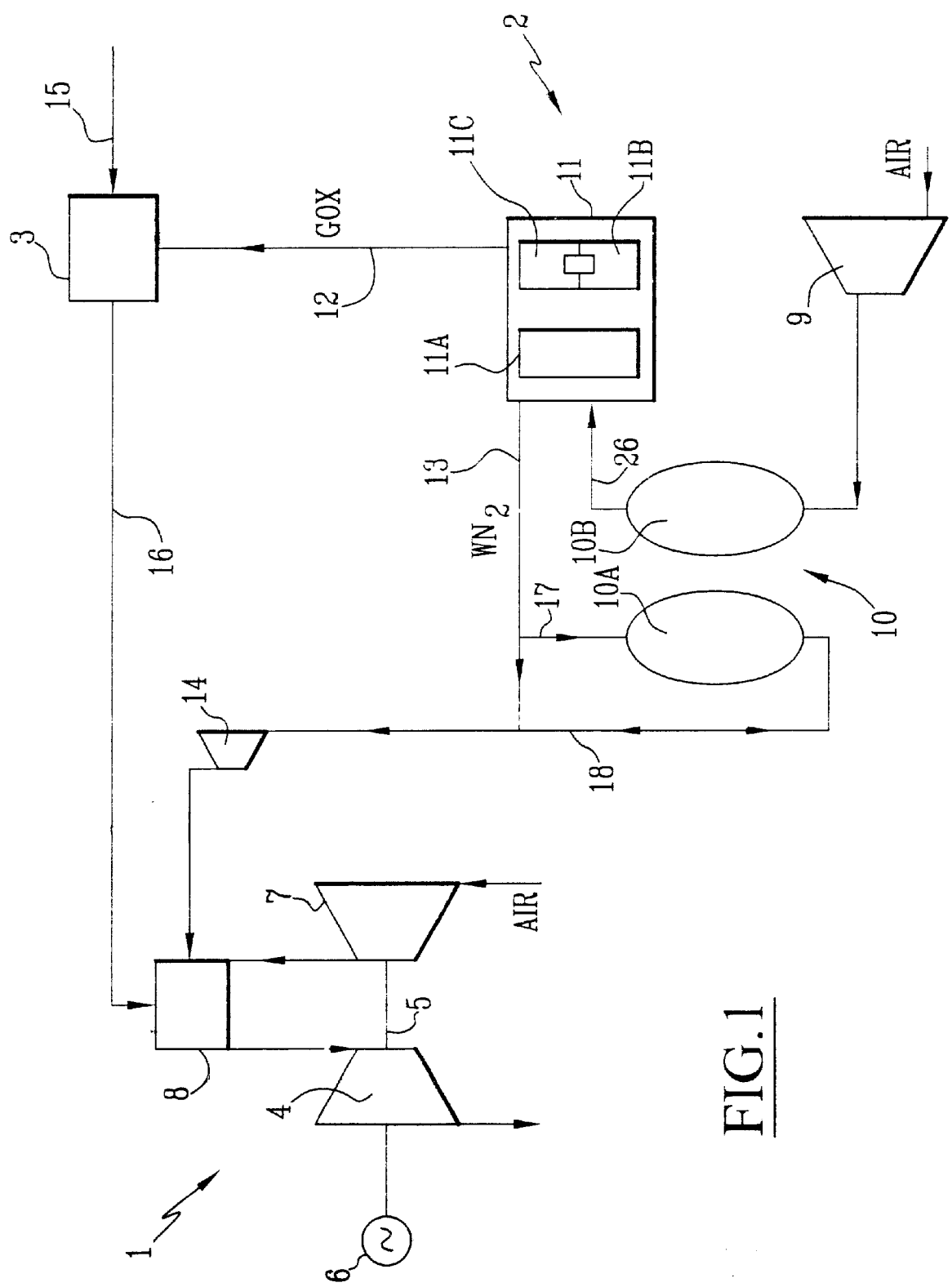
FIG. 1 shows very schematically an electricity generation plant according to the invention.

FIG. 1 shows very schematically an electricity generation plant which comprises a gas turbine 1 combined with an air distillation unit 2, and a gasifier 3.

The gas turbine mainly comprises a turbine 4 whose shaft 5 is coupled to an alternator 6 and to an air compressor 7, and a combustion chamber 8.

The air distillation unit 2 mainly comprises an air compressor 9, an apparatus 10 for purifying air of water and of $CO_2$ by adsorption, this apparatus comprising two adsorbers 10A and 10B in parallel, and a cold box 11 which mainly comprises a heat exchange line 11A and a double air distillation column consisting of a medium-pressure column 11B and of a low-pressure column 11C.

The word "compressor" may mean a single compressor or several compressors in parallel. Similarly, the word "adsorber" may refer to a single adsorption bottle or to several bottles in parallel, and there may be several air distillation units 2 in parallel, if the demand for oxygen by the gasifier 3 is very high, which is generally the case.

In operation, the atmospheric air intended to be distilled and compressed at 9 has a medium distillation pressure greater than 10 bar, typically 13 bar. The compressed air is purified by one of the two adsorbers, the adsorber 10B in FIG. 1, then is cooled in the heat exchange line 11A with counter-current of the distillation products. In the double column, the low-pressure column 11B of which operates at 3 to 4 bar, the air is separated into pressurized oxygen which is sent in gas form, via a pipe 12, to the gasifier 3 and into impure nitrogen $WN_2$, which exits the cold box via a pipe 13. This pipe is connected to the intake of a nitrogen compressor 14, the delivery side of which is connected to the combustion chamber 8.

Furthermore, the gasifier is fed with carbon products via a pipe 15 and produces a pressurized fuel gas, which is sent via a pipe 16 to the combustion chamber 8. The latter is further fed with compressed air by the compressor 7 of the gas turbine.

A portion of the impure nitrogen is taken off in the pipe 13 via a tap-off 17 in order to regenerate the adsorber which is not in the adsorption phase, that is the adsorber 10A in FIG. 1. As described below in more detail, the impure nitrogen having passed through this adsorber is recovered via a pipe 18 and reinjected into the pipe 13, the mixture thus arriving at the compressor 14.

Figure 2:
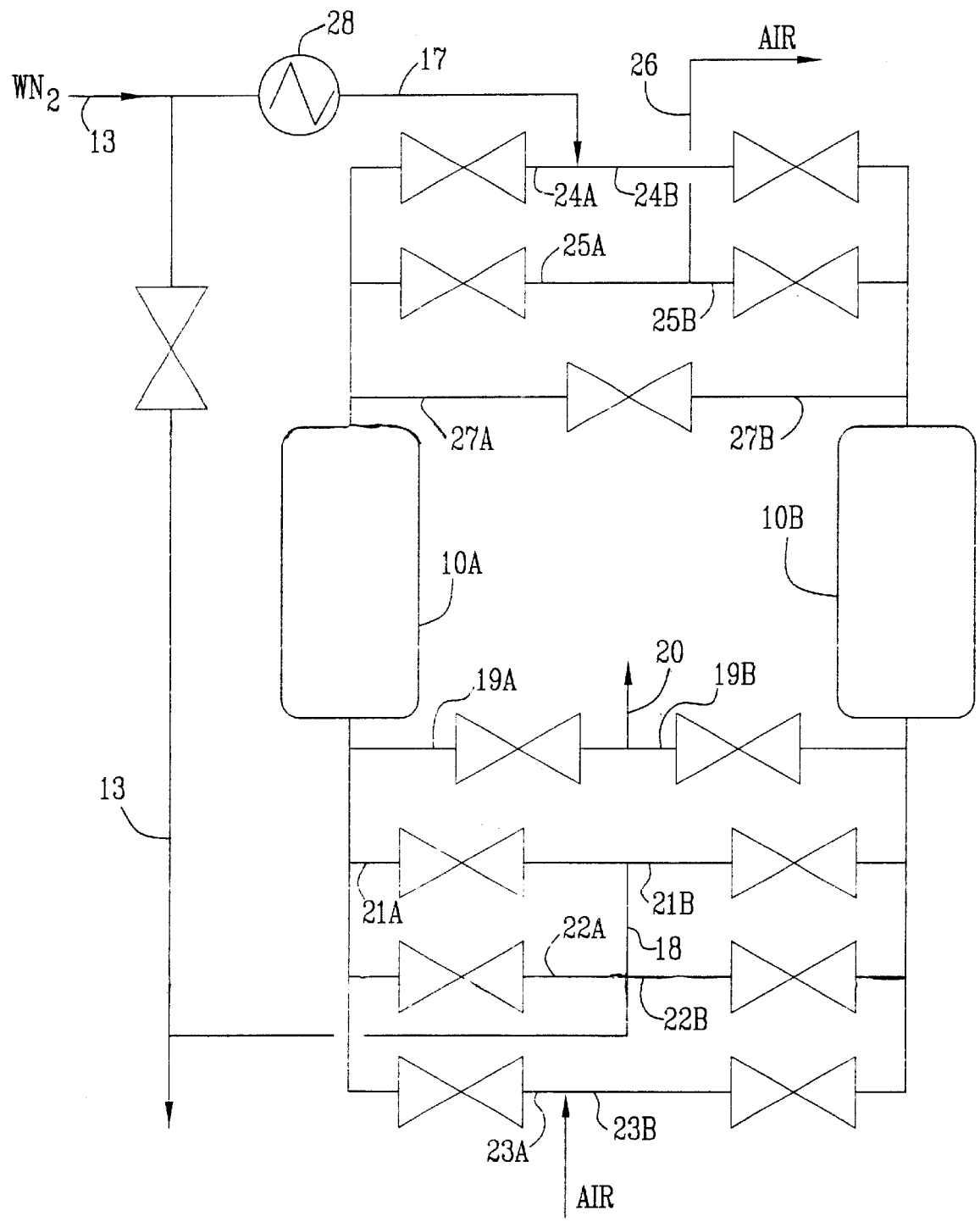
FIG. 2 shows in more detail part of this plant.

FIG. 2 shows the purification apparatus 10 in more detail.

The intake of each adsorber is connected to four pipes each fitted with a valve: one pipe 19A or 19B for venting to atmosphere, connected to a vent pipe 20; one partial repressurization pipe 21A or 21B, connected to the pipe 18; one pipe 22A or 22B for removing purging gas, also connected to the pipe 18; and one air inlet pipe 23A or 23B, connected to the delivery side of the compressor 9.

The outlet of each adsorber is connected to three pipes each fitted with a valve: one impure nitrogen feed pipe 24A or 24B, connected to the pipe 17; one purified air outlet pipe 25A or 25B, connected to a pipe 26 which leads to the cold box 11, and one first repressurization pipe 27A or 27B, connected to the outlet of the other adsorber.

As indicated in FIG. 2, the pipe 17 is equipped with a heating device 28.

Figure 3:
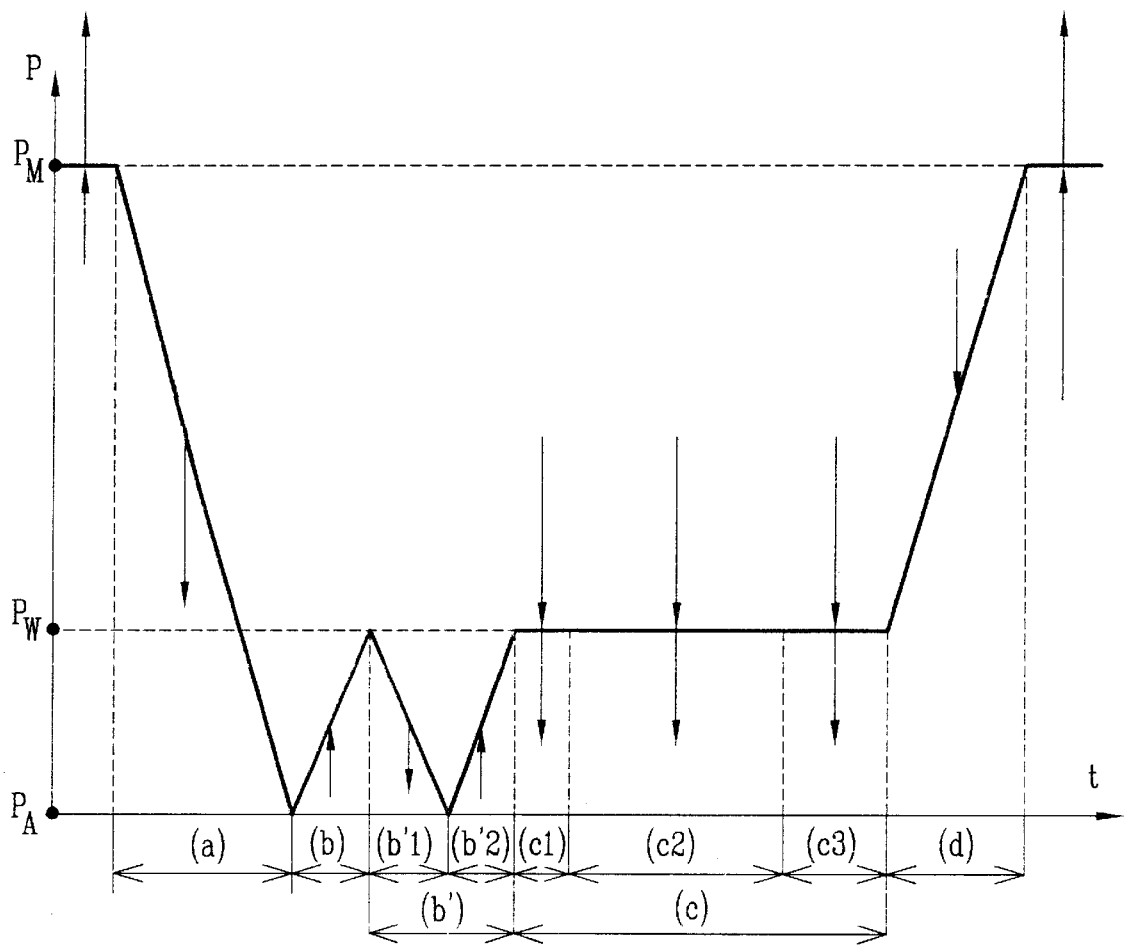
FIG. 3 is a diagram which illustrates the operating cycle of an adsorber.

The operating cycle of each adsorber, offset by a half period with respect to that of the other adsorber, is shown in FIG. 3. In this diagram, where the time t is plotted on the x-axis and the absolute pressures P on the y-axis, the lines indicated by arrows show the direction of flow in the adsorber: when an arrow is in the direction of increasing pressure (upwards in the diagram), the current is called "with a co-current", in the adsorber. If the arrow directed upwards is located below the line showing the pressure in the adsorber, the current enters the adsorber by the inlet end of the adsorber; if the arrow, directed upwards, is located above the line showing the pressure, the current leaves the adsorber by the outlet end of the adsorber, the inlet and outlet ends being respectively those of the air to be treated and of the purified air withdrawn in the adsorption phase; when an arrow is in the direction of decreasing pressure (downwards in the diagram), the current is called "with a counter-current", in the adsorber. If the arrow directed downwards is located below the line showing the pressure of the adsorber, the current leaves the adsorber by the inlet end of the adsorber; if the arrow directed downward is located above the line showing the pressure, the current enters the adsorber by the outlet end of the adsorber, the inlet and outlet ends being still those of the gas to be treated and of the gas withdrawn in the production phase.

The cycle of FIG. 3 comprises the following successive steps.

At the end of the adsorption phase at the high pressure of the $P_M$ cycle, which is almost the medium distillation pressure, the adsorber undergoes the following steps:

(a) depressurization with a counter-current down to atmospheric pressure $P_A$ by venting to atmosphere via the pipe 19 and the vent 20;

(b) partial repressurization by unheated impure nitrogen (device 28 inactive), with a co-current, via the pipes 18 and 21, up to the pressure $P_W$ of this gas. This step decreases the oxygen content in the adsorber; (b') depressurization with a counter-current down to atmospheric pressure $P_A$ by venting to atmosphere via the pipes 19 and 20 (b'1), then another partial repressurization by unheated impure nitrogen, with a co-current, via the pipes 18 and 21, up to the pressure $P_W$ (b'2). Thus, the oxygen content of the adsorber is again reduced, and goes below the maximum permissible value in the combustion chamber 8 of the gas turbine;

(c) purging with a counter-current, via the pipes 17 and 24 for the entry, 22 and 18 for the withdrawal. This purging is carried out first of all with unheated gas (c1), then with gas heated at 28 (c2), then again with unheated gas (c3). Throughout this step, impure nitrogen coming from the adsorber is recovered via the pipes 22 and 18 and reinjected into the pipe 13, where it is mixed with the impure nitrogen carried by this pipe;

(d) repressurization with a counter-current by purified air coming from the other adsorber, via the pipe 27, up to the high pressure $P_M$ of the cycle.

It will be noted that this cycle involves consumption of impure nitrogen for the partial repressurizations (b) and (b'2), this impure nitrogen no longer being available to feed the nitrogen compressor 14. The corresponding flow rate of impure nitrogen is about 5% of the air flow rate, which reduces the flow rate available for the nitrogen compressor by the same amount.

Figure 4:
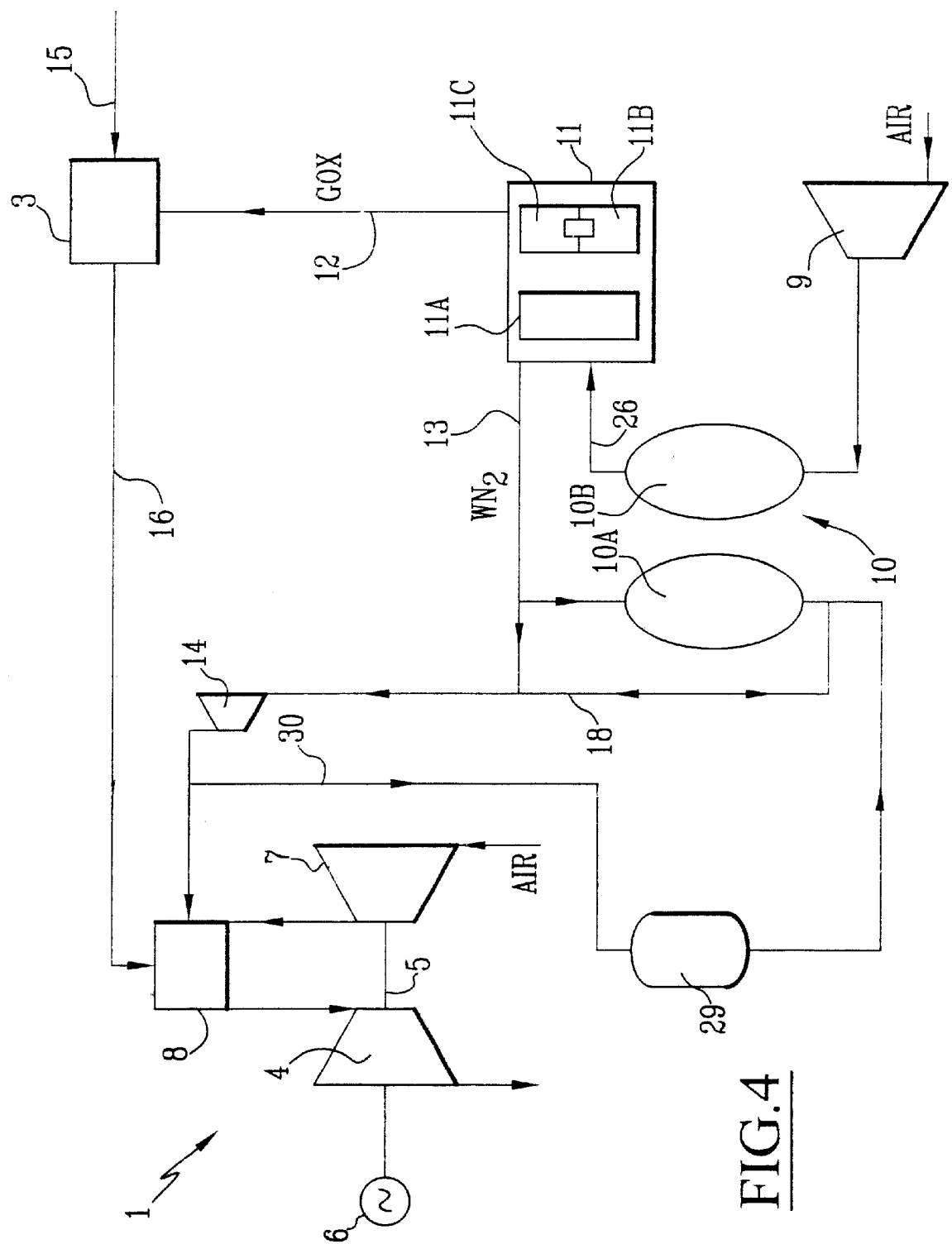
FIG. 4 is a view, similar to FIG. 1, of a variant.
Figure 5:
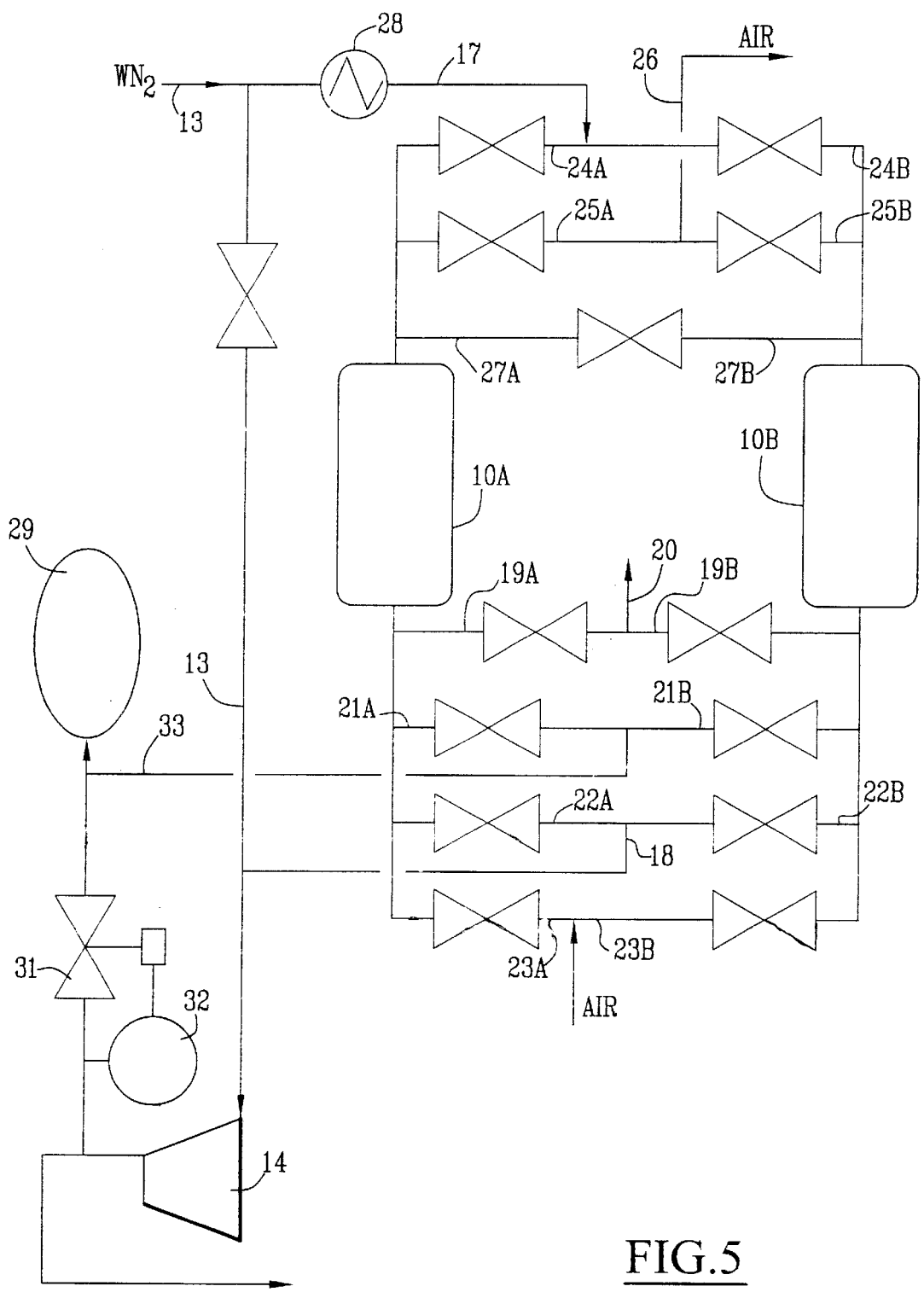
FIG. 5 is a view, similar to FIG. 3, corresponding to the plant of FIG. 4.

In order to reduce this drawback, it is possible to use, in order to carry out the partial repressurizations (b) and (b'2), pressurized nitrogen not coming directly from the cold box 11. This nitrogen may be supplied by a nitrogen supply network, or else by an auxiliary tank 29 of impure nitrogen, shown in FIGS. 4 and 5. This tank is fed by a tap-off 30 provided at the delivery side of the compressor 14 and equipped with an expansion valve 31 driven by a flow rate controller 32 (FIG. 5). As shown in FIG. 5, the pipes 21 are no longer connected to the pipe 18, but they are connected to the tank 29 via a pipe 33.

By virtue of the presence of the tank 29, the flow rate of impure nitrogen needed for steps (b) and (b'2) is distributed throughout the duration of the cycle, which makes it possible to increase the flow rate available for the compressor 14.

What is claimed is:

1. Method of feeding, with impure nitrogen, a combustion chamber of a gas turbine combined with an air distillation unit, the air distillation unit being equipped with an apparatus for purifying air of water and of $CO_2$ by adsorption, said apparatus comprising two adsorbers, each one of which follows an operating cycle which comprises, alternately and cyclically, a co-current adsorption phase at a high pressure of the cycle, and a regeneration phase, the regeneration phase comprising a decompression step (a), a step (c) of counter-current purging by waste gas from the air distillation unit coming from a low-pressure column of this unit, and a step (d) of recompressing the adsorber up to the high pressure of the cycle, wherein:

the low-pressure column operates at a low pressure which is clearly greater than atmospheric pressure;

the waste gas is used almost at said low pressure for the purging step (c);

the decompression step (a) is continued down to a minimum pressure of the cycle which is clearly less than said low pressure;

between the decompression step (a) and the purging step (c), a partial repressurization step (b) is inserted, in which the adsorber is repressurized with waste gas up to almost the purging pressure; and the waste gas coming from the adsorber during the purging step (c) is mixed with the waste gas produced by the air distillation unit, and the mixture is compressed by a nitrogen compressor in order to feed the combustion chamber of the gas turbine.

2. Method according to claim 1, wherein the minimum pressure of the cycle is almost atmospheric pressure.

3. Method according to claim 1, wherein, after the partial repressurization step (b), an additional step (b') of depleting the adsorber of oxygen is carried out at least once, which step comprises the following substeps:

(b'1) additional decompression of the adsorber down to said minimum pressure, and (b'2) additional partial repressurization up to the purging pressure, then the purging step (c) is carried out.

4. Method according to claim 1, wherein the purging step (c) comprises a substep (c2) during which the waste gas is heated followed by a substep (c3) during which the waste gas is not heated.

5. Method according to claim 1, wherein a nitrogen-rich gas, having at least the nitrogen content of said impure nitrogen, not coming directly from the low-pressure column, is used in order to carry out the or each partial repressurization step (6).

6. Method according to claim 5, wherein the nitrogen-rich gas comes from a nitrogen distribution network.

7. Method according to claim 5, wherein the nitrogen-rich gas comes from an auxiliary tank fed by part of the gas delivered by the nitrogen compressor.

8. Electricity generation plant, comprising a gas turbine, an air distillation unit producing impure nitrogen, the air distillation unit being equipped with an apparatus for purifying air of water and of $CO_2$ by adsorption, said apparatus comprising at least two adsorbers, each one of which follows an operating cycle which comprises, alternatively and cyclically, a co-current adsorption phase at a high pressure of the cycle, and a regeneration phase, the regeneration phase comprising a decompression step (a), a step (c) of counter-current purging by waste gas from the air distillation unit coming from a low-pressure column of the air distillation unit, and a step (d) of recompressing the adsorber up to the high pressure of the cycle, and a nitrogen compressor having an intake which is connected to the air distillation unit by a feed pipe (13), and a delivery side which is connected to a combustion chamber of the gas turbine, and in which:

the air distillation unit produces impure nitrogen under a low pressure which is clearly greater than atmospheric pressure;

a first impure nitrogen pipe fitted with a valve connects the air distillation unit to the purified air outlet of each adsorber; and a second impure nitrogen pipe fitted with a valve connects the air inlet of each adsorber to said feed pipe.

9. Plant according to claim 8, wherein the first impure nitrogen pipe is equipped with a heating device.

10. Plant according to claim 9, further comprising means for feeding each adsorber with nitrogen-rich gas not coming directly from the low-pressure column of the air distillation unit.

11. Plant according to claim 8, further comprising means for feeding each adsorber with nitrogen-rich gas not coming directly from the low-pressure column of the air distillation unit.

12. Plant according to claim 11, further comprising a nitrogen distribution network from which the nitrogen-rich gas is taken.

13. Plant according to claim 11, further comprising an auxiliary tank fed by part of the gas delivered by the nitrogen compressor.

* * * * *